(12) United States Patent
Hayashi et al.

(10) Patent No.: US 6,178,515 B1
(45) Date of Patent: Jan. 23, 2001

(54) MULTI-CPU DEVICE CAPABLE OF AUTOMATICALLY SHUTDOWN GENERAL PURPOSE OS WHEN FEED FROM MAIN POWER SUPPLY IS INTERRUPTED

(75) Inventors: Shouichi Hayashi, Omiya; Jun Itoh, Tokyo, both of (JP)

(73) Assignee: Wellbean Co., Inc. (JP)

( * ) Notice: Under 35 U.S.C. 154(b), the term of this patent shall be extended for 0 days.

(21) Appl. No.: 09/175,190

(22) Filed: Oct. 20, 1998

(30) Foreign Application Priority Data

Oct. 31, 1997 (JP) ...................................................... 9-315998

(51) Int. Cl.⁷ ...................................................... G06F 9/445
(52) U.S. Cl. ................................. 713/300; 713/1; 713/324
(58) Field of Search ................................. 713/1, 300, 324

(56) References Cited

U.S. PATENT DOCUMENTS 5,159,691 * 10/1992 Fujita ........................................ 713/1
5,481,456 * 1/1996 Ogura ........................................ 701/1
5,495,606 * 2/1996 Borden et al. ............................ 707/3

FOREIGN PATENT DOCUMENTS

409146896 * 6/1997 (JP).

* cited by examiner

Primary Examiner—Krisna Lim
(74) Attorney, Agent, or Firm—Steinberg & Raskin, P.C.

(57) ABSTRACT

A multi-CPU device capable of automatically carrying out normal shutdown of a general purpose OS when feed of a current from a main power supply is interrupted while being significantly reduced in manufacturing cost. The multi-CPU device includes a master CPU block mounted therein with a general purpose OS, a slave CPU block mounted therein with a realtime OS, and a unit for controlling a controlled equipment based on the realtime OS. The multi-CPU device also includes a UPS provided with a realtime OS interface. The realtime OS outputs a DC current from a battery to the master CPU block and slave CPU block when the service interruption sensing circuit of the UPS senses service interruption. The realtime OS interface outputs a service interruption sensing signal to the realtime OS, so that the realtime OS which detected service interruption shuts down the general purpose OS.

4 Claims, 6 Drawing Sheets

MULTI-CPU DEVICE CAPABLE OF AUTOMATICALLY SHUTDOWN GENERAL PURPOSE OS WHEN FEED FROM MAIN POWER SUPPLY IS INTERRUPTED

BACKGROUND OF THE INVENTION

This invention relates to a multi-CPU device for industrial applications, and more particularly to a multi-CPU device including a master CPU block mounted therein with a general purpose operating system (OS) and a slave CPU block mounted therein with a realtime OS.

A conventional multi-CPU device is constructed in such a manner as shown in FIGS. 5 and 6 by way of example. More specifically, a multi-CPU device generally designated at reference numeral 30 in FIG. 5 is provided therein with a power supply 18. The power supply 18 is constructed so as to convert an AC current fed thereto from an external feed circuit 21 through a UPS 22 into a DC current required and output it therefrom. The power supply 18 is connected to both a master-side structure 1 and a slave-side structure 19.

The master-side structure 1 is adapted to be operated by an operator and includes a master CPU block 2 mounted therein with a general purpose OS suitable for a user interface. The master CPU block 2 includes a CPU 3, a ROM 4 and a RAM 5 and has a storage means 6, an input unit 7 such as a key board, a mouse or the like, and a monitor 8 connected thereto.

Also, the master-side structure 1 includes a bus 9 connected to the master CPU block 2. The bus 9 has a common memory 20 connected to one end thereof, so that a signal may be transmitted between the master CPU block 2 and the common memory 20 through the common memory 20.

The slave-side structure 19 is adapted to control an equipment to be controlled (hereinafter referred to as "controlled equipment") 50 such as a production apparatus or the like and includes a slave CPU block 12. The slave CPU block 12 is mounted therein with a realtime OS having realtime characteristics suitable for a control system. Also, the slave CPU block 12 includes a CPU 13, a ROM 14 and a RAM 15 and has a bus 11 connected thereto. The bus 11 is connected to a control function blocks 16 and 17.

The bus 11 thus arranged is connected at one end thereof to the common memory 20 described above. The common memory 20 functions as a memory which permits the master CPU block 2 of the master-side structure 1 and the slave CPU block 12 of the slave-side structure 19 to be accessed to each other through the buses 9 and 11 through the common memory 20. Such construction permits a signal to be transmitted through the common memory 20 between the master CPU block 2 of the master-side structure 1 and the slave CPU block 12 of the slave-side structure 19.

The control function blocks 16 and 17 described above each function as a contact input and output section, an analog/digital converter (hereinafter referred to as "A/D converter"), a digital-analog converter (hereinafter referred to as "D/A converter") and the like. The control function blocks 16 and 17 are connected directly to the controlled equipment 50. The control function blocks 16 and 17 control the controlled equipment 50 depending on a signal outputted from the slave CPU block 12.

In FIGS. 5 and 6, arrows of a double line each indicate a current feed wiring and other arrows each indicate a signal line.

Now, the manner of control of the controlled equipment 50 by the conventional multi-CPU device 30 will be described.

First, when the multi-CPU device 30 is activated, a control program stored in the storage means 6 of the master-side structure 1 is down-loaded through the master CPU block 2, bus 9, common memory 20 and bus 11 to the RAM 15 of the slave CPU block 12 according to an activation program previously stored in the ROM 14. The control program thus down-loaded functions to control both function and operation timings of the control function blocks 16 and 17. Such down-loading of the control program to the RAM 15 permits the CPU 13 to control the control function blocks 16 and 17 according to the control program thus down-loaded.

In the conventional multi-CPU device 30 thus constructed, the control function block 16 functions as a D/A converter, to thereby output an analog signal to the controlled equipment 50. Thus, the controlled equipment 50 is operated depending on the signal, so that a result of the operation is output in the form of an analog signal to the control function block 17. In this case, the control function block 17 acts as an A/D converter, to thereby fetch the analog signal fed from the controlled equipment 50, resulting in converting it into a digital signal, followed by returning of the digital signal to the CPU 13. The CPU 13 functions to control a timing at which the control function block 16 output the analog signal, a timing at which the control function block 17 fetches the analog signal from the controlled equipment 50 and a timing at which the control function block 17 outputs the digital signal to the CPU 13.

Now, construction of a plurality of the thus-constructed multi-CPU devices 30 into a production line or the like will be described with reference to FIG. 6. The current feed circuit 21 is connected to the UPS 22, which is then connected to a plurality of the multi-CPU devices 30. The multi-CPU devices 30 each function to control the controlled equipment 50 connected thereto.

The UPS 22 includes a battery (not shown) and a service interruption sensing circuit (not shown). The UPS 22 functions to feed an AC current fed from the current feed circuit 21 therethrough to the power supply 18 of each of the multi-CPU devices 30 without any action on the AC current. Also, the UPS 22, when feed of the AC current from the current feed circuit 21 is interrupted due to service interruption or the like, functions to convert a DC current fed from the battery into an AC current and feed the AC current to the power supply 18 arranged in each of the multi-CPU devices 30.

Such arrangement of the UPS 22 between the current feed circuit 21 and each of the multi-CPU devices 30 is for the purpose of preventing system-down of the multi-CPU device 30 when feed of a current to the multi-CPU device 30 is abruptly interrupted due to service interruption or the like. In particular, the general purpose OS mounted in the master CPU block 2 of each of the multi-CPU devices 30 possibly causes loss or vanishment of data unless it is shut down according to a predetermined procedure. In order to eliminate such a problem, the conventional multi-CPU device is so constructed that the battery of the UPS 22 continues to feed a current during at least a period of time for which the shutdown is executed, resulting in ensuring that the shutdown is normally attained while ensuring satisfactory storage of the data.

To this end, an operator must normally shut down the multi-CPU device 30 prior to exhaustion of a battery current of the UPS 22, when service interruption occurs. Although an increase in capacity of the battery would increase a period of time for which the battery can feed a current, this renders the battery equipment large-sized and complicated, leading to an increase in both a space for the battery and a manufacturing cost of the battery. Thus, an increase in capacity of the battery should be limited to a reduced level. Thus, an operator is still required to execute shutdown of the multi-CPU device as soon as service interruption occurs.

In particular, in a line wherein a plurality of multi-CPU devices 30 are arranged as shown in FIG. 6, an operator must manually shut down all of the master CPU blocks 2 of the individual multi-CPU devices 30 within a period of time for which the battery feeds a current. This causes operation by the operator to be highly troublesome and often leads to a failure in shutdown of the master CPU blocks 2.

In view of the foregoing, a system is proposed which is adapted to automatically shut down the general purpose OSs by means of the UPS. The system proposed is constructed so as to connect the multi-CPU device and UPS to each other by communications. Thus, the UPS is required to be provided with a program for shutdown corresponding to each of the general purpose OSs connected to the UPS. Also, construction of a system which permits automatic shutdown of the general purpose OSs between the UPS and the general purpose OSs which have no relationship to each other in connection with a software requires much time and costs a great deal.

Also, the system proposed renders operation of the general purpose OS unstable and, in the worst case, causes it to be often locked. Such locking of the general purpose OS leads to stoppage of the multi-CPU device 30 and therefore stoppage of the controlled equipment 50 connected thereto. However, an operator fails to perceive locking of the general purpose OS unless he operates a key board or the like.

When the operator is late in perceiving the locking, the controlled equipment 50 is kept interrupted. Such interruption or stoppage of the controlled equipment 50 for a long period of time causes a great loss when it is a manufacturing equipment.

SUMMARY OF THE INVENTION

The present invention has been made in view of the foregoing disadvantage of the prior art.

Accordingly, it is an object of the present invention to provide a multi-CPU device which is capable of automatically carrying out normal shutdown of a general purpose OS when feed from a main power supply is interrupted.

It is another object of the present invention to provide a multi-CPU device which is capable of being significantly reduced in manufacturing cost.

It is a further object of the present invention to provide a multi-CPU device which is capable of automatically detecting unstableness of operation of a general purpose OS to rapidly accommodate thereto.

In accordance with the present invention, a multi-CPU device is provided. The multi-CPU device includes a master CPU block mounted therein with a general purpose OS, a slave CPU block mounted therein with a realtime OS, and a bus arranged for connecting the mater CPU block and slave CPU block to each other therethrough. The bus is connected to control function blocks connected to a controlled equipment, so that the controlled equipment may be controlled through the control function blocks based on the realtime OS of the slave CPU block.

The term "general purpose OS" used herein indicates an operation system (OS) inferior in realtime characteristics but superior in user interface characteristics and the term "realtime OS" used herein indicates an OS exhibiting realtime characteristics suitable for equipment control and measuring.

The multi-CPU device generally constructed as described above includes a UPS constructed so as to convert an AC current inputted thereto into a DC current and output the DC current to the master CPU block and slave CPU block. The UPS includes a battery, a service interruption sensing circuit and a realtime OS interface. The realtime OS includes a program of shutting down a general purpose OS and is constructed so as to output a DC current from the battery to the master CPU block and slave CPU block when the service interruption sensing circuit of the UPS senses service interruption. The realtime OS interface outputs a service interruption sensing signal to the realtime OS, so that the realtime OS which has detected service interruption shuts down the general purpose OS.

In a preferred embodiment of the present invention, the bus arranged between the control function blocks and the master CPU block and slave CPU block is formed with a switch circuit and the switch circuit is turned off to intercept communication between the control function blocks and the master CPU block and slave CPU block when the realtime OS detects service interruption.

Also, in a preferred embodiment of the present invention, the general purpose OS outputs a shutdown termination signal to the realtime OS when shutdown of the general purpose OS is terminated. The realtime OS outputs a command for interrupting feed of a current from the battery of the UPS when it detects the shutdown termination signal outputted from the general purpose OS.

Further, in a preferred embodiment of the present invention, the master CPU block is mounted therein with a soundness check program linked with the general purpose OS through a software and operated concurrently with the general purpose OS, wherein the soundness check program outputs a soundness confirmation signal to the realtime OS and the realtime OS outputs operation an unstableness detection signal when it detects unstableness of operation of the general purpose OS.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

A multi-CPU device according to the present invention will be described hereinafter with reference to FIGS. 1 to 4.

Figure 1:
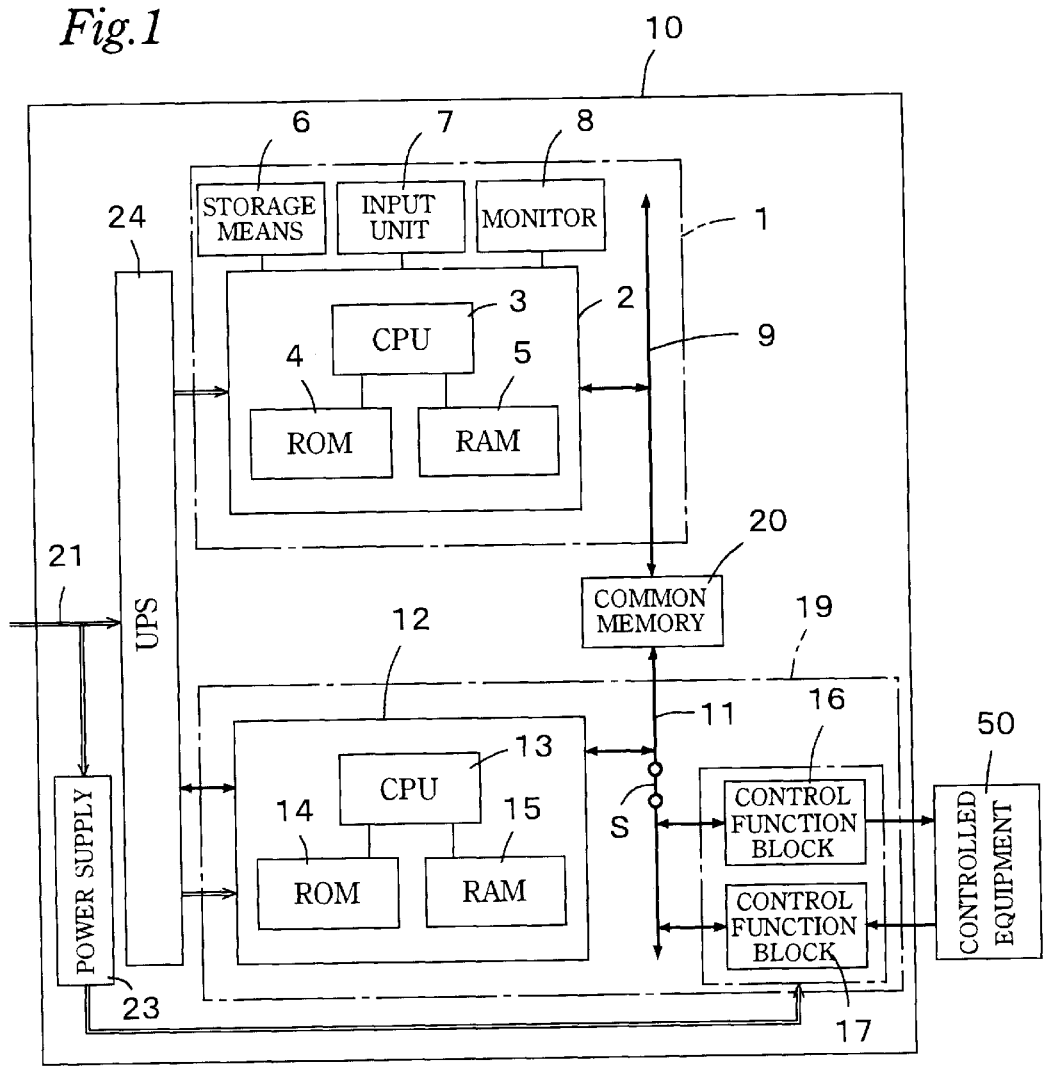
FIG. 1 is a block diagram showing an embodiment of a multi-CPU device according to the present invention.
Figure 2:
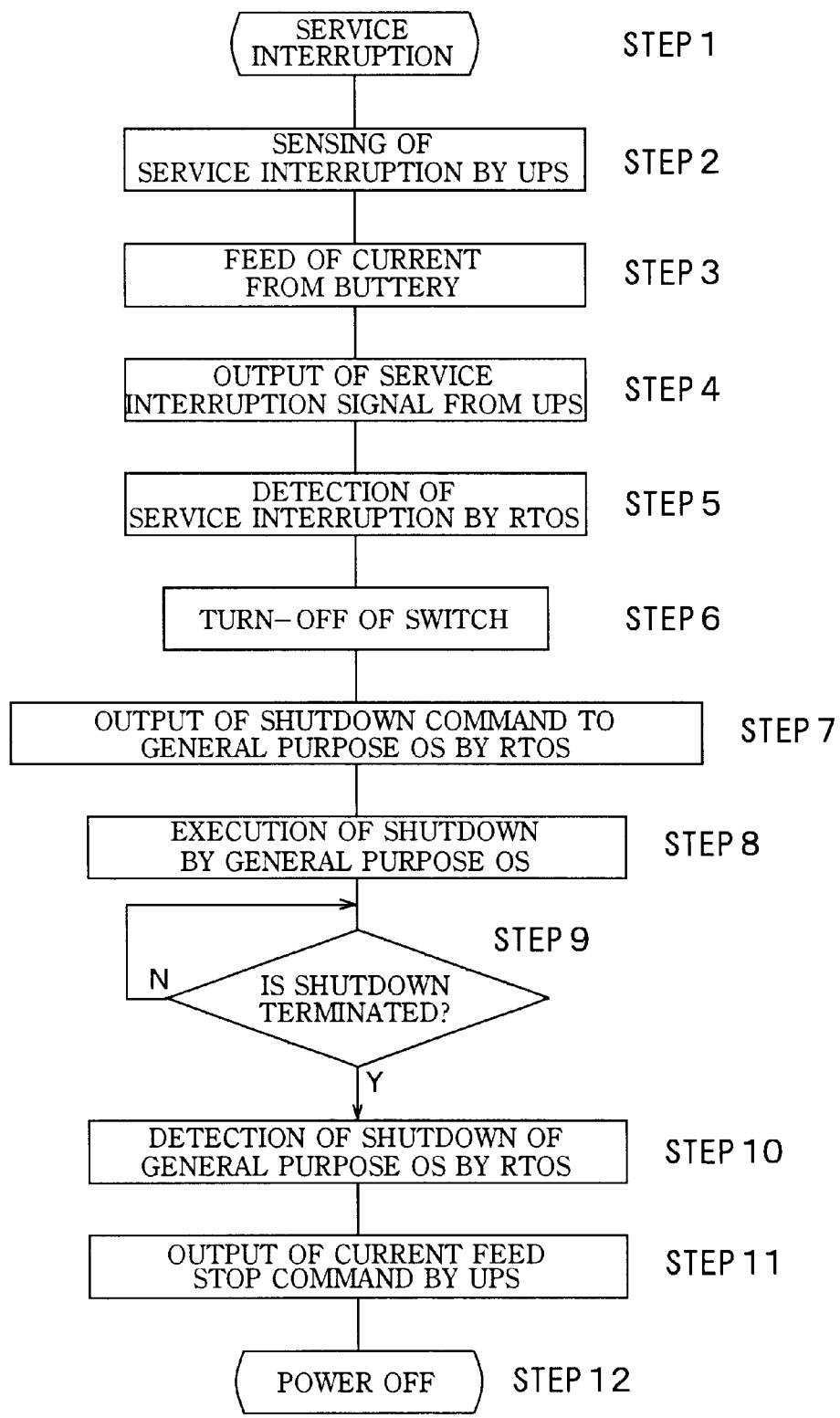
FIG. 2 is a flow chart showing a procedure of automatically shutting down a general purpose OS in the multi-CPU device of FIG. 1 when service interruption occurs.
Figure 3:
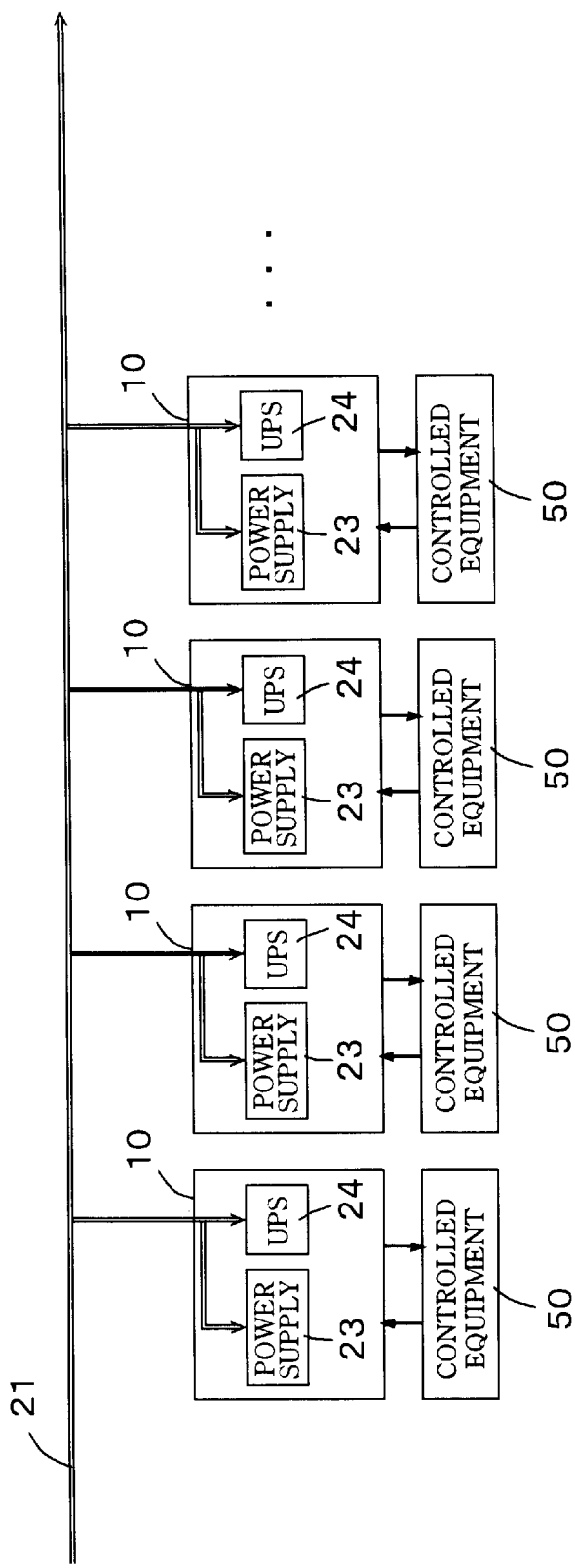
FIG. 3 is a block diagram showing arrangement of a plurality of the multi-CPU devices of FIG. 1.

Referring first to FIGS. 1 to 3, an embodiment of a multi-CPU device according to the present invention is illustrated. A multi-CPU device of the illustrated embodiment which is generally designated at reference numeral 10 is provided therein with a UPS 24.

The UPS 24, as shown in FIG. 1, is connected to a master CPU block 2 of a master-side structure 1 and a slave CPU block 12 of a slave-side structure 19. The UPS 24 includes a battery (not shown), a service interruption sensing circuit (not shown) and a realtime OS interface (not shown). The UPS 24 normally functions to covert an AC current inputted through an external current feed circuit 21 thereto into a DC current and feed the thus-converted DC current to the master CPU block 2 and slave CPU block 12. When feed of the AC current to the UPS 24 is interrupted due to service interruption or the like, the battery arranged in the UPS 24 feeds with each of the master CPU block 2 and slave CPU block 12 with a DC current required.

Also, the UPS 24 is adapted to carry out exchanges of a signal between the UPS 24 and a realtime OS mounted in the slave CPU block 12 by means of the realtime OS interface.

The multi-CPU device 10 is provided therein with a power supply 23. The power supply 23 is connected to the current feed circuit 21 for feed of an AC current to convert an AC current into a DC current, to thereby feed the DC current to control function blocks 16 and 17, like the power supply 18 of the prior art described above.

The slave-side structure 19 includes a bus 11 for connecting the control function blocks 16 and 17 and the slave CPU block 12 to each other therethrough. The bus 11 is provided thereon with a switch S. The switch S functions to selectively establish connection between the control function blocks 16 and 17 and the master CPU block 2 and slave CPU block 12.

The slave CPU block 12 is mounted therein with the realtime OS. The realtime OS has a program added thereto which functions to shut down the general purpose OS mounted in the master CPU block 2 when service interruption occurs. Also, the realtime OS has a program incorporated therein which functions to turn off the switch S on the bus 11 to separate the control function blocks 16 and 17 from the CPU blocks 2 and 12.

The master CPU block 2 is mounted therein with a general purpose OS. The general purpose OS is constructed so as to generate a termination signal when shutdown of the general purpose OS is terminated. Also, the general purpose OS has a soundness check program added thereto which functions to check whether or not the general purpose OS is sound. The soundness check program is adapted to operate when the general purpose OS is operated. Also, the soundness check program periodically or regularly outputs a soundness confirmation signal such as a pulse signal or the like to the realtime OS.

Such construction permits the realtime OS to detect or confirm soundness of the general purpose OS depending on whether or not the soundness confirmation signal is inputted thereto. If the general purpose OS is rendered unstable, resulting in being locked, the soundness check program fails to output the soundness confirmation signal, so that the realtime OS may detect unstableness of operation of the general purpose. When the realtime OS detects unstableness of the general purpose OS, the realtime OS outputs unstableness detection signal.

Referring now to FIG. 3, arrangement of a plurality of the multi-CPU devices 10 for constituting a production line or the like is illustrated. In this instance, the current feed circuit 21 is connected to the power supply 23 and UPS 24 arranged in each of the multi-CPU devices 10.

The manner of operation of the thus-arranged and connected multi-CPU devices for controlling the controlled equipment 50 is substantially the same as the conventional multi-CPU devices 30 described above.

When feed of a current from the current feed circuit 21 to each of the multi-CPU devices 10 is interrupted due to service interruption, the multi-CPU device 10 is operated according to a flow chart of FIG. 2, to thereby permit the realtime OS to shut down the general purpose OS.

Now, a procedure of shutting down the general purpose OS when service interruption occurs will be described with reference to FIG. 2, wherein "RTOS" indicates the realtime OS.

Step 1 indicates a state that feed of a current from the current feed circuit 21 is interrupted due to service interruption. Then, in Step 2, the service interruption sensing circuit of the UPS 24 senses service interruption on the basis of the fact that an AC current is not fed to the UPS 24. In Step 3, the UPS 24 feeds a current from the battery to the master CPU block 2 and slave CPU block 12.

Thereafter, in Step 4, the UPS 24 outputs a service interruption sensing signal through the realtime OS interface to the realtime OS. In Step 5, the realtime OS detects the service interruption.

Then, in Step 6, the realtime OS which has detected the service interruption turns off the switch S arranged on the bus 11. At this time, the control function blocks 16 and 17 are interrupted or isolated from the master CPU block 2 and slave CPU block 12. This keeps a current of the battery from being fed from the master CPU block 2 and slave CPU block 12 through the buses 9 and 11 to the control function blocks 16 and 17. Instead, it is fed to only the CPU blocks 2 and 12. Thus, the illustrated embodiment prevents the current from being fed to the parts which are not concerned with shutdown of the general purpose OS, leading to savings of the current.

Subsequently, in Step 7, the realtime OS activates a program of shutting down the general purpose, to thereby permit a shutdown command to be fed to the general purpose OS. In Step 8, the general purpose OS executes shutdown thereof based on the shutdown command thus fed thereto.

Then, in Step 9, the realtime OS judges whether or not the general purpose OS terminated the shutdown. When the general purpose OS is during the shutdown operation, the general purpose OS outputs, to the realtime OS, a signal indicating that the general purpose OS is during the shutdown operation. In this instance, the realtime OS waits for termination of the shutdown.

When a shutdown termination signal is outputted after the shutdown is terminated, the procedure is advanced to Step 10, so that the realtime OS detects termination of the shutdown.

Then, in Step 11, a signal indicating that feed of a current from the battery should be stopped is fed to the UPS 24 by the realtime OS. Also, the realtime OS carries out shutdown thereof. Thus, Step 12 permits the whole system to be powered off.

Thus, in the illustrated embodiment, when the UPS 24 arranged in the multi-CPU device 10 senses service interruption, the realtime OS automatically shuts down the general purpose OS.

Therefore, the illustrated embodiment does not require that an operator operates the multi-CPU device 10. Rather, the realtime OS automatically carries out shutdown of the general purpose OS, to thereby ensure that data of the general purpose OS is positively stored.

Also, in such arrangement of a plurality of the multi-CPU devices 10 as shown in FIG. 3, the multi-CPU devices 10 each are operated according to the procedure described above, so that each of the realtime OSs automatically carries out shutdown of the general purpose OS corresponding thereto.

In addition, the battery arranged in each of the UPSs 24 is merely required to have a capacity of shutting down one multi-CPU device 10 corresponding thereto, resulting in being small-sized as compared with the battery in the conventional UPS 22 described above.

Further, shutdown of the general purpose OS by the realtime OS permits a period of time required for the shutdown to be reduced as compared with the shutdown by manual operation of an operator, to thereby reduce a capacity of the battery correspondingly.

In particular, the illustrated embodiment is so constructed that the switch S arranged on the bus 11 is turned off to keep a current of the battery from being fed to the parts other than the CPU blocks 2 and 12 when service interruption occurs. Such construction reduces load of the battery, to thereby further reduce the battery.

Moreover, in the illustrated embodiment, it is not required that the UPS 24 converts a DC current of the battery power supply into an AC current, like the UPS 22 in the prior art described above. This is for the reason that the UPS 24 is arranged in the multi-CPU device 10, resulting in the battery feeding a DC current directly to the master CPU block 2 and slave CPU block 12. Thus, the UPS 24 is not required to convert the DC current into an AC current, resulting in being small-sized correspondingly.

Furthermore, the UPSs 24 each are exclusively used for the multi-CPU device 10 in which it is incorporated, so that only a software which permits access to the realtime OS of the multi-CPU device 10 is merely required. This permits the UPS 24 to be further reduced in size, leading to cost savings.

As described above, the UPS 24 equipped with the battery is reduced in size, to thereby facilitate incorporation of the UPS 24 into the multi-CPS device. Also, the realtime OS judges termination of shutdown of the general purpose OS, to thereby automatically interrupt feed of the current, so that waste of the current may be minimized.

The multi-CPU device 10 of the illustrated embodiment constructed as described above functions to automatically shut down the general purpose OS when the AC power supply which feeds an AC current to the UPS 24 is interrupted. Such a function of the multi-CPU device 10 may be utilized not only when service interruption occurs by an accident or the like but when the power supply is normal. For example, turning-off of a main power supply such as a breaker or the like permits all of the multi-CPU devices 10 to be shut down at the same time. In other words, the whole system in which a plurality of the multi-CPU devices 10 are arranged may be rapidly powered off in the lump without individually shutting down the multi-CPU devices 10.

Now, the manner of accommodation to unstableness of operation of the general purpose OS due to any cause will be described with reference to FIG. 4.

The general purpose OS, as described above, has the soundness check program added thereto. The soundness check program permits the general purpose OS to output a soundness confirmation signal to the realtime OS. Also, the program which permits the realtime OS to output an unstableness detection signal is added to the realtime OS.

First, when the general purpose OS is operated in Step 1, the general purpose OS outputs a soundness confirmation signal to the realtime OS. Then, in Step 2, the realtime OS checks soundness of the general purpose OS based on the soundness confirmation signal. Unless any abnormality is found out, Step 2 is repeated. When any abnormality or unstableness is detected, the procedure is advanced to Step 3. In step 3, the realtime OS outputs an unstableness detection signal.

In Step 4, the realtime OS resets the general purpose OS based on the unstableness detection signal thus outputted. Then, in Step 5, the realtime OS restarts the general purpose OS.

This permits the realtime OS to detect unstableness of operation of the general purpose OS to automatically reset the general purpose OS.

Figure 4:
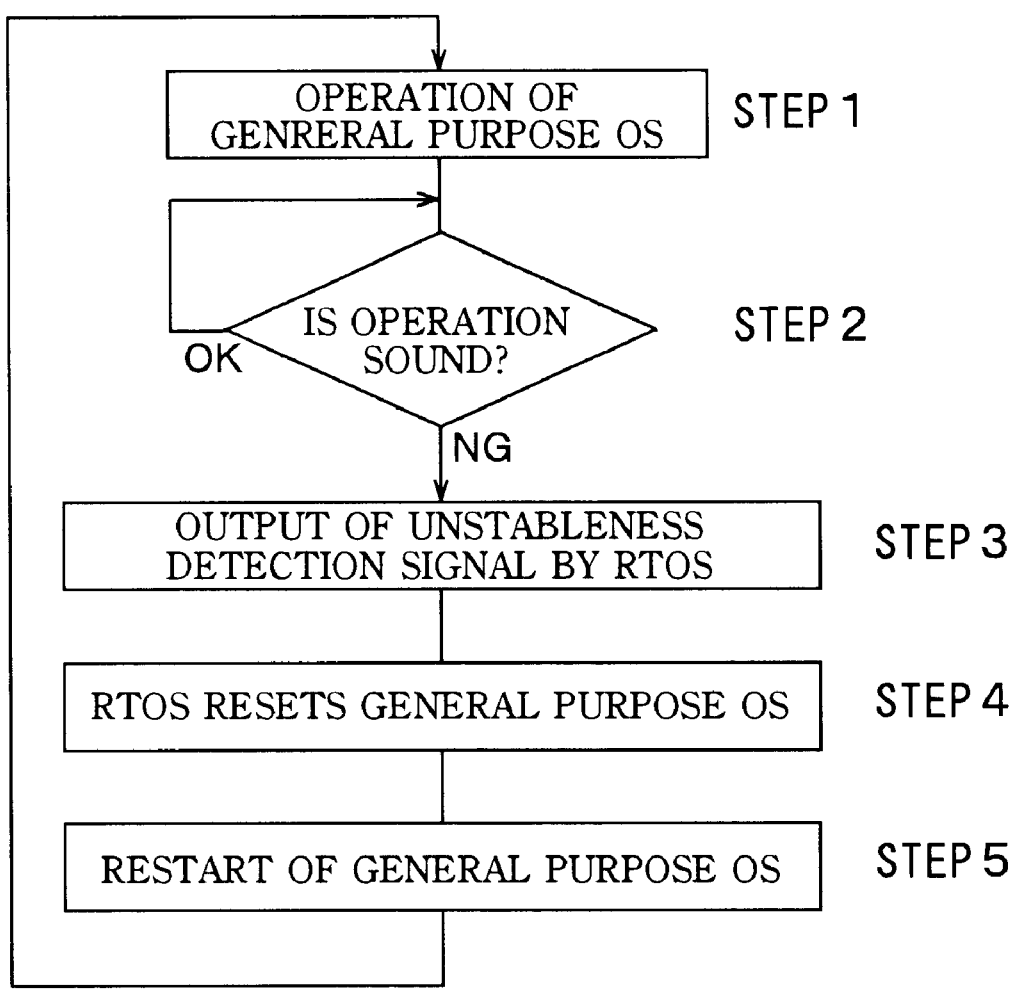
FIG. 4 is a flow chart showing a procedure of detecting unstableness of operation of a general purpose OS in multi-CPU device of FIG. 1.
Figure 5:
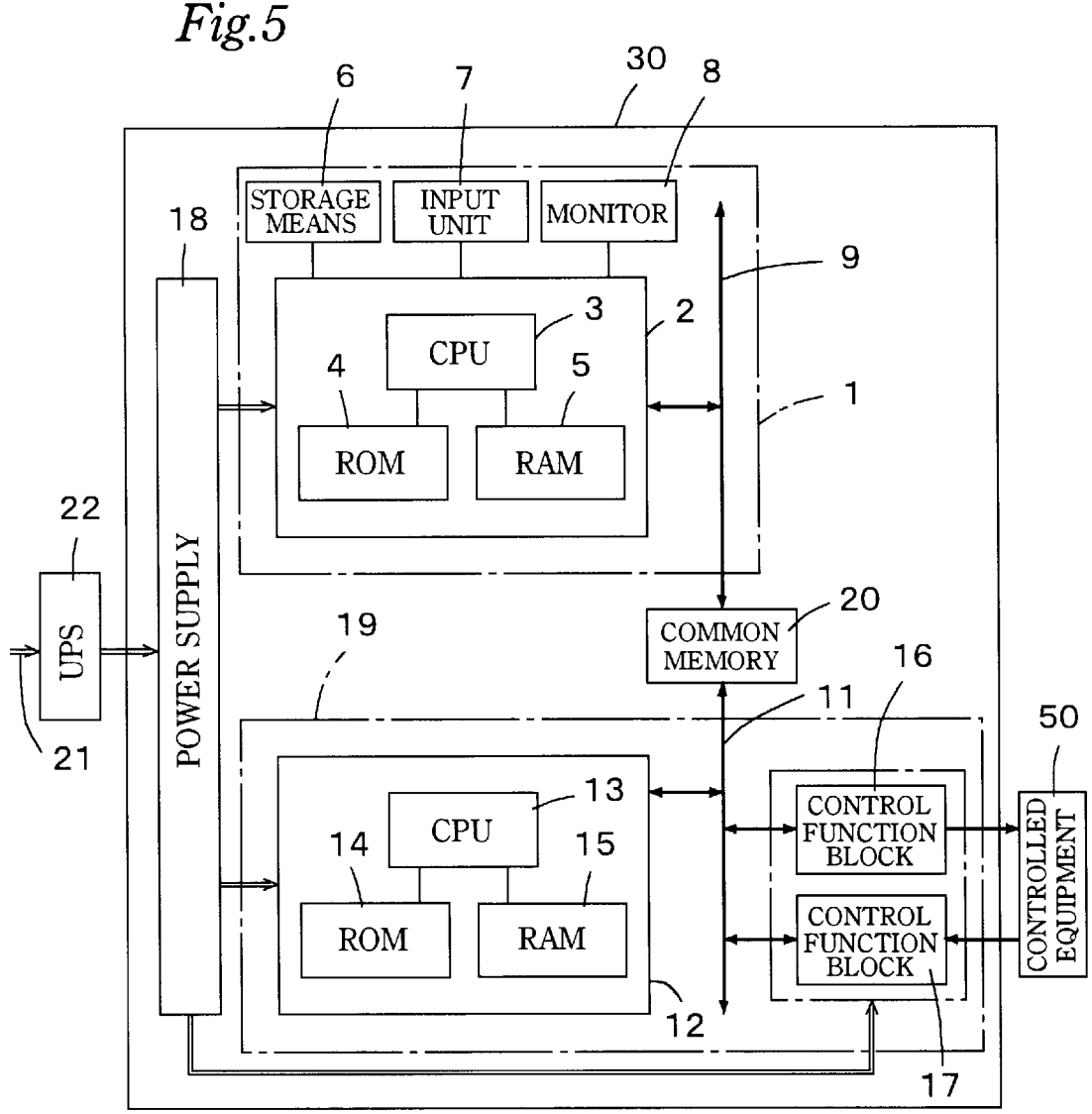
FIG. 5 is a block diagram showing a conventional multi-CPU device.
Figure 6:
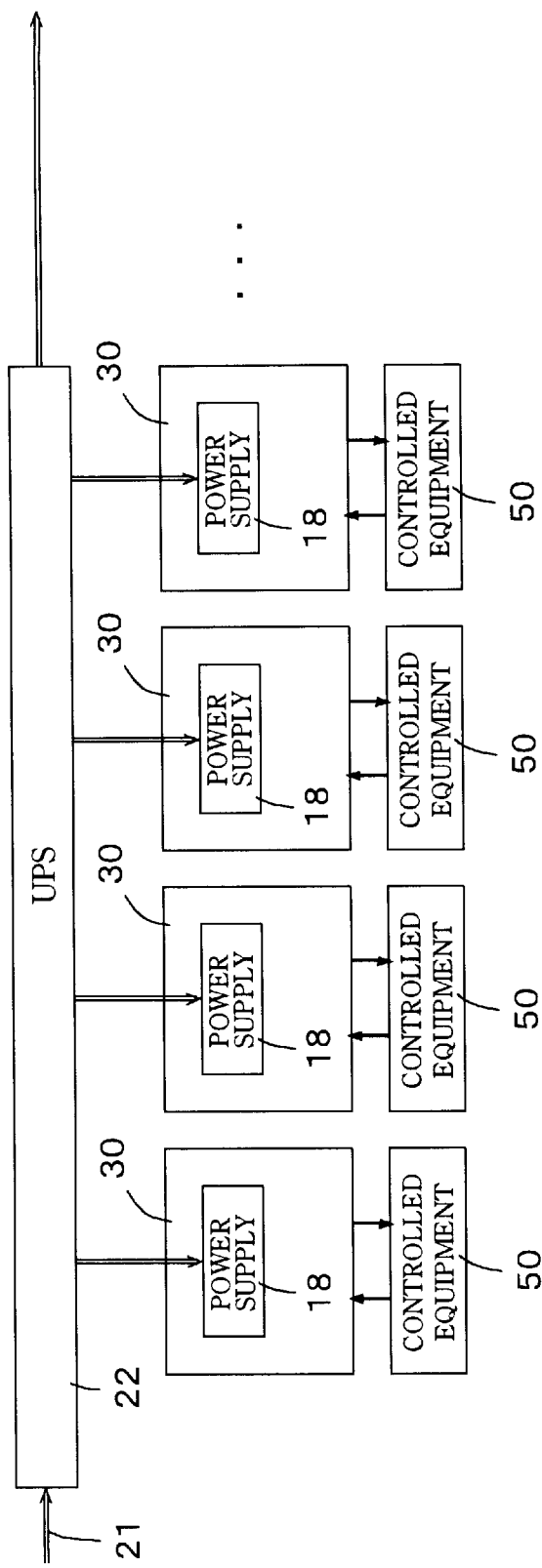
FIG. 6 is a block diagram showing arrangement of a plurality of the conventional multi-CPU devices of FIG. 5.

Thus, the illustrated embodiment is so constructed that in Step 3 shown in FIG. 4, the realtime OS outputs the unstableness detection signal to the general purpose OS to automatically reset the general purpose OS. Alternatively, the unstableness detection signal may be outputted to another equipment. For example, after Step 3, an alarm may be fed with an alarm signal. In this instance, any suitable means such as a bell or the like may be used to call an operator, so that he may manually release lock of the general purpose OS.

In any event, the illustrated embodiment permits unstableness of the general purpose OS to be automatically detected, to thereby rapidly accommodate to any abnormality.

In the illustrated embodiment, a control program is down-loaded from the master-side structure 1 through the bus 9, a common memory 20 and the bus 11 to a RAM 15 of the slave-side structure 19. Such construction permits a new control program to be down-loaded from the master-side structure and set in the RAM 15, also when a previous control program is to be replaced with the new control program.

However, the illustrated embodiment is not limited to down-loading of the control program from the master-side structure 1. The control program may be set in a ROM of slave-side structure 19. In this instance, a change in control program may be carried out by replacement of the ROM.

As can be seen from the foregoing, in the multi-CPU device of the present invention, the multi-CPU devices each are provided with the UPS, so that the realtime OS automatically carries out shutdown of the general purpose OS when service interruption occurs. Thus, even when service interruption suddenly occurs, the UPS positively senses the service interruption, so that the realtime OS may rapidly carry out the shutdown operation as compared with manual shutdown operation by an operator. Also, the present invention permits the general purpose OSs to be shut down in the lump, so that the whole system in which a plurality of the multi-CPU device are arranged may be powered off in the lump. Further, the present invention permits the individual battery to be reduced in capacity and eliminates arrangement of any conversion circuit for converting a DC current of the battery into an AC current. This attains small-sizing of the UPS and cost savings thereof, to thereby facilitate incorporation of the UPS into the multi-CPU device.

Also, the multi-CPU device of the present invention may be so constructed that the bus arranged between the control function blocks and the master CPU block and slave CPU block is formed with the switch circuit, wherein the switch is turned off to intercept communication between the control function blocks and the master CPU block and slave CPU block when the realtime OS detects service interruption. Such construction keeps a current of the battery from flowing to the parts of the multi-CPU device other than the master CPU block and slave CPU block when service interruption occurs. This significantly reduces a capacity of the battery to a lowermost level. The capacity at the lowermost level means a capacity of the battery which permits current feed to be carried out for only a period of time required for shutdown of the general purpose OS by a minimum treatment. Thus, the UPS may be further small-sized and reduced in cost.

Further, in the present invention, the general purpose OS outputs a shutdown termination signal to the realtime OS when shutdown of the general purpose OS is terminated and the realtime OS outputs a command for interrupting feed of a current from the battery of the UPS when it detects the shutdown termination signal outputted from the general purpose OS. Thus, the present invention eliminates waste current feed.

Moreover, the present invention may be constructed in the manner that the master CPU block is mounted therein with the soundness check program linked with the general purpose OS through the software and operated concurrently with the general purpose OS, wherein the soundness check program outputs a soundness confirmation signal to the realtime OS and the realtime OS outputs an operation unstableness detection signal when it detects unstableness of operation of the general purpose OS. Such construction permits unstableness of operation of the general purpose OS to be rapidly and positively detected as compared with detection by an operator. Also, the realtime OS outputs a signal upon detection of unstableness of operation of the general purpose OS, resulting in the unstableness being rapidly detected.

What is claimed is:

1. A multi-CPU device comprising:

a master CPU block mounted therein with a general purpose OS;

a slave CPU block mounted therein with a realtime OS;

a bus arranged for connecting said master CPU block and slave CPU block to each other therethrough;

said bus being connected to control function blocks connected to a controlled equipment, so that the controlled equipment may be controlled through said control function blocks based on said realtime OS of said slave CPU block; and a UPS constructed so as to convert an AC current inputted thereto into a DC current and output the DC current to said master CPU block and slave CPU block;

said UPS including a battery, a service interruption sensing circuit and a realtime OS interface;

said realtime OS including a program of shutting down said general purpose OS;

said realtime OS outputting a DC current from said battery to said master CPU block and slave CPU block when said service interruption sensing circuit of said UPS senses service interruption;

said realtime OS interface outputting a service interruption sensing signal to said realtime OS, so that said realtime OS which detected service interruption shuts down said general purpose OS.

2. A multi-CPU device as defined in claim 1, wherein said bus arranged between said control function blocks and said master CPU block and slave CPU block is formed with a switch circuit;

said switch circuit being turned off to intercept communication between said control function blocks and said master CPU block and slave CPU block when said realtime OS detects service interruption.

3. A multi-CPU device as defined in claim 1, wherein said general purpose OS outputs a shutdown termination signal to said realtime OS when shutdown of said general purpose OS is terminated; and said realtime OS outputs a command for interrupting feed of a current from said battery of said UPS when it detects the shutdown termination signal outputted from said general purpose OS.

4. A multi-CPU device as defined in claim 1, wherein said master CPU block is mounted therein with a soundness check program linked with said general purpose OS through a software and operated concurrently with said general purpose OS;

said soundness check program outputting a soundness confirmation signal to said realtime OS;

said realtime OS outputting operation an unstableness detection signal when it detects unstableness of operation of said general purpose OS.

\* \* \* \* \*